(12) United States Patent  (10) Patent No.: US 11,041,989 B2
Tsai  (45) Date of Patent: Jun. 22, 2021

(54) METHOD OF SPLICING OPTICAL FIBERS AND STRUCTURE OF SPLICED OPTICAL FIBER

(71) Applicant: NATIONAL CHENG KUNG UNIVERSITY, Tainan (TW)

(72) Inventor: Tzong-Yow Tsai, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 0 days.

(21) Appl. No.: 16/508,307

(22) Filed: Jul. 11, 2019

(65) Prior Publication Data
US 2021/0011219 A1    Jan. 14, 2021

(51) Int. Cl.
*G02B 6/25* (2006.01)
*G02B 6/255* (2006.01)
*G02B 6/02* (2006.01)

(52) U.S. Cl.
CPC ......... *G02B 6/2551* (2013.01); *G02B 6/2553* (2013.01); *G02B 6/2555* (2013.01); *G02B 6/02009* (2013.01)

(58) Field of Classification Search
CPC .. G02B 6/2551; G02B 6/2553; G02B 6/2555; G02B 6/02009
USPC ........................................................ 385/96
See application file for complete search history.

(56) References Cited

U.S. PATENT DOCUMENTS

| 6,603,909 | B2 | 8/2003 | Varner |
| 2002/0081086 | A1 | 6/2002 | Varner |
| 2003/0056547 | A1* | 3/2003 | Yamada ............... G02B 6/2551 65/407 |
| 2003/0210878 | A1 | 11/2003 | Kumano et al. |
| 2004/0114886 | A1* | 6/2004 | Christensen ......... G02B 6/2552 385/96 |
| 2006/0209908 | A1* | 9/2006 | Pedersen ............... H01S 3/1115 372/6 |
| 2007/0147738 | A1* | 6/2007 | Wang ..................... G01N 21/45 385/43 |

(Continued)

FOREIGN PATENT DOCUMENTS

| CN | 1405588 | 3/2003 |
| CN | 101852885 A | 10/2010 |
| TW | 201835623 | 10/2018 |

OTHER PUBLICATIONS

Tzong-Yow Tsai, Zhi-Cheng Lee, Hong-Xi Tsao, and Shih-Ting Lin, Enhanced arc-induced core expansion for mode-field adaptation using a H2-loaded fiber-190415, published in USA.

*Primary Examiner* — Jerry M Blevins
(74) *Attorney, Agent, or Firm* — Raymond Y. Chan; David and Raymond Patent Firm

(57) ABSTRACT

The present invention therefore provides a method of splicing optical fibers. First, a first optical fiber and a second optical fiber are provided, wherein a core diameter of the first optical fiber is smaller than a core diameter of the second optical fiber. After performing a hydrogen loading treatment for the first optical fiber; a thermal expansion core (TEC) treatment is performed for the first optical fiber and the second optical fiber to match the mode-field (MF) of the first optical fiber and the second optical fiber at the fused section between the first optical fiber and the second optical fiber. The present invention further provides a spliced optical fiber, including a first optical fiber part, a second optical fiber part, and a fused section.

15 Claims, 9 Drawing Sheets

(56) References Cited

U.S. PATENT DOCUMENTS

2009/0060417 A1\* 3/2009 Bilodeau .................. G02B 6/14
385/43

\* cited by examiner

METHOD OF SPLICING OPTICAL FIBERS AND STRUCTURE OF SPLICED OPTICAL FIBER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention is related to a method of splicing optical fibers and a structure of spliced optical fiber, and more particularly, to a method of splicing optical fiber containing a hydrogen loading treatment and further to a structure of spliced optical fiber.

Description of Related Arts

A monolithic system with all fusion-spliced fiber components is free of troublesome alignment and regular maintenance. Its nature of no internal air gap provides the advantages of negligible dissipation losses and intra-cavity Fresnel reflections between the fused components that benefit a high beam quality and a great system efficiency. Due to the maturity of arc-splice technology, a monolithic fiber system with a large variety of fiber components can be easily assembled. However, for some systems that employ large mode-field area (LMA) fibers and have low tolerance of loss, such as high power fiber lasers and passively Q-switched fiber lasers, more sophisticated fiber splicing techniques involving fiber tapering or thermally diffused expanded core (TEC) for high-end mode field (MF) adaptation are required. The TEC method has been theoretically modeled and studied thoroughly, and applied in various devices such as MF adaptors, pump combiners, fiber couplers for laser diodes and mode coupling in twin-core fibers. Unlike fiber tapering, which involves a physical change in the cladding layer, a typical TEC process for MF adaptation is to heat up the fiber of a small core by an oxygen-hydrogen flame to force the dopants that define the core geometry to diffuse. After the core is expanded and a desired MF area is reached, the heated zone of the fiber is cleaved and spliced with another LMA fiber. For a passive silica fiber, the core profile is determined by the Ge dopant and the diffusion coefficient of Ge is approximately $1 \times 10^{15}$ m$^2$/s at 1400° C. At this temperature, the heating time for the effective core diameter to expand from 4 to 10 μm is more than an hour. Such a long duration of heating above the glass melting point could cause fiber distortion by its own gravity and make the heated zone too fragile and difficult for the later MF adapting processes, i.e., being cleaved and spliced with another LMA fiber.

Little attention has been paid to the arc-induced TEC method mainly because of the inherent drawback of an ultrashort arc-induced TEC region of a few hundreds of micrometers. To achieve an adiabatic (lossless) MF transition in such a short TEC region, the MF adaptable ratio between the two mismatched fibers is severely restricted. In addition, the short TEC region makes the later process of cleaving impracticable. Thus, MF adapting can only be performed by adding arcs at the arc-spliced intersection of the two mismatched fibers. In such a process, both the cores of the fibers at the intersection are treated and thermally expanded with the same arc power. Despite these drawbacks, MF adapting using arcs can be achieved in only tens of seconds and is still considered the most elegant and straightforward method.

SUMMARY OF THE PRESENT INVENTION

The present invention therefore provides a method of splice optical fibers thereto reduce the transmission loss between two optical fibers.

According to one embodiment, the present invention therefore provides a method of splicing optical fibers. First, a first optical fiber and a second optical fiber are provided, wherein a core diameter of the first optical fiber is smaller than a core diameter of the second optical fiber. After performing a hydrogen loading treatment for the first optical fiber; a thermal expansion core (TEC) treatment is performed for the first optical fiber and the second optical fiber to match the mode-field (MF) of the first optical fiber and the second optical fiber at the fused section between the first optical fiber and the second optical fiber.

According to another embodiment, the present invention further provides a spliced optical fiber, including a first optical fiber part, a second optical fiber part, and a fused section. The first optical fiber part includes a first core layer, and the second optical fiber part includes a second core layer, wherein the first core layer has a dimeter less than that of the second core, and the first optical fiber part comprises hydrogen and the second optical fiber part does not comprise hydrogen. The fused section is disposed at the intersection between the first optical fiber part and the second optical fiber part, wherein the mode-field of the first optical fiber and the second optical fiber are matched at the fused section.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

To provide a better understanding of the presented invention, preferred embodiments will be described in detail. The preferred embodiments of the present invention are illustrated in the accompanying drawings with numbered elements.

The present invention is directed to a method of splicing optical fibers. Please refer to FIG. 1 to FIG. 3, which illustrate the splicing method according to one embodiment of the present invention. The steps of the method will be described in the following context in detail.

Figure 1:
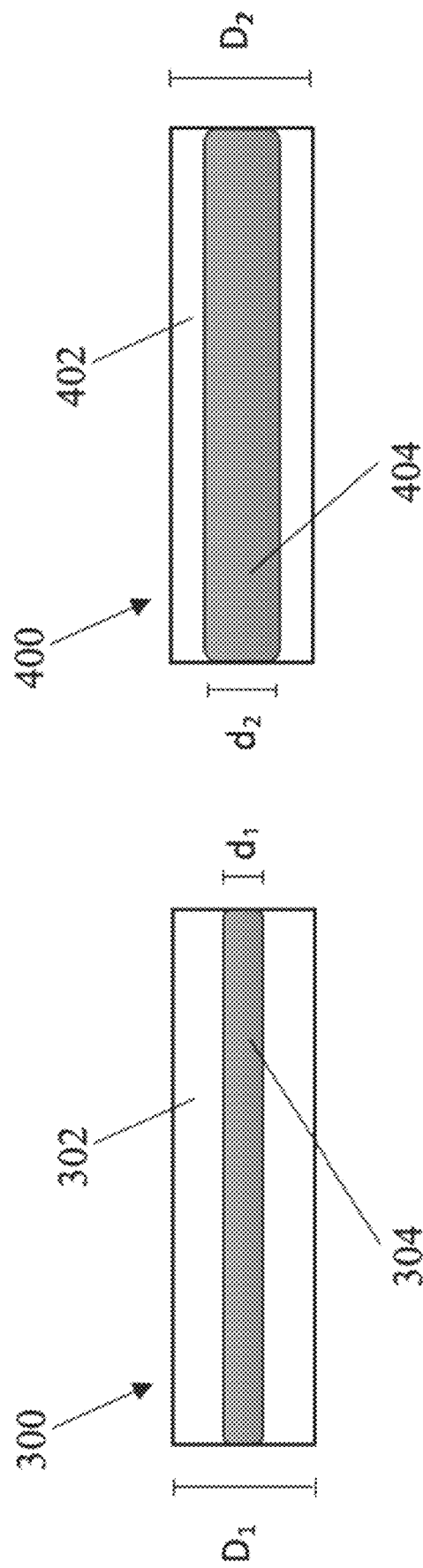
FIG. 1 to FIG. 3 illustrate schematic diagrams showing the method of splicing optical fiber according to one embodiment in the present invention.

As show in FIG. 1, a first optical fiber 300 and a second optical fiber 400 are provided. The first optical fiber 300 and the second optical fiber 400 are, for example, single mode optical fibers and are composed of silicon oxide ($SiO_2$). The first optical fiber 300 has a cladding layer 302 and a core layer 304, and the second optical fiber 400 has a cladding layer 402 and a core layer 404. The core layer 304 and the core layer 404 have semiconductor dopants such as germanium implanted therein. It can be understood that the area of the core layer 304 in the first optical fiber 300 and the area of the core layer 404 in the second optical fiber 400 are defined by the semiconductor dopant. In one embodiment, since the present method aims at splicing different optical fibers, the core diameters of the two optical fibers can be different. As shown in FIG. 1, the core diameter $d_1$ of the core layer 304 in the first optical fiber 300 is less than the core diameter $d_2$ of the core layer 404 in the second optical fiber 400. In one embodiment, the outer diameter $D_1$ of the first optical fiber 300 is equal to the outer diameter $D_2$ of the second optical fiber 400. however, they can be different in another embodiment. In one embodiment, a mode field area ratio of the first optical fiber 300 and the second optical fiber 400 is between 1.3 and 16.

Figure 2:
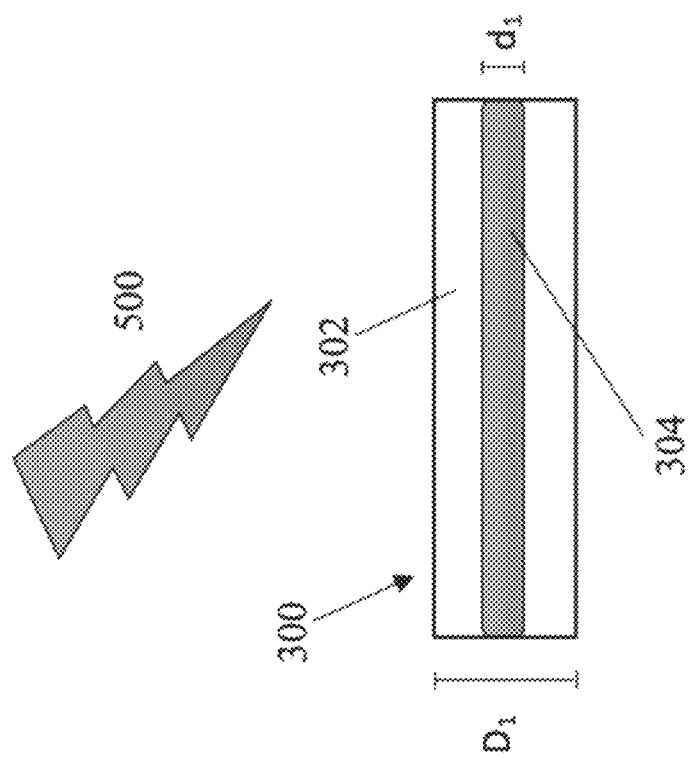

As shown in FIG. 2, the first optical fiber 300 is subjected to a hydrogen loading treatment 500. The hydrogen loading treatment 500 refers to any means that is able to inject hydrogen atoms into the optical fiber to form germanium-oxygen deficiency centers (GODC) with the dopants germanium in the core layer. In one embodiment, the hydrogen loading treatment is to incubate the first optical fiber 300 into a high pressure hydrogen environment, making the hydrogen atoms penetrate into the first optical fiber 300. High pressure hydrogen environment is, for example, 1200 psi (pound per square inch or pound-force per square inch) 2000 psi, maintained about 4 to 14 days.

Figure 3:
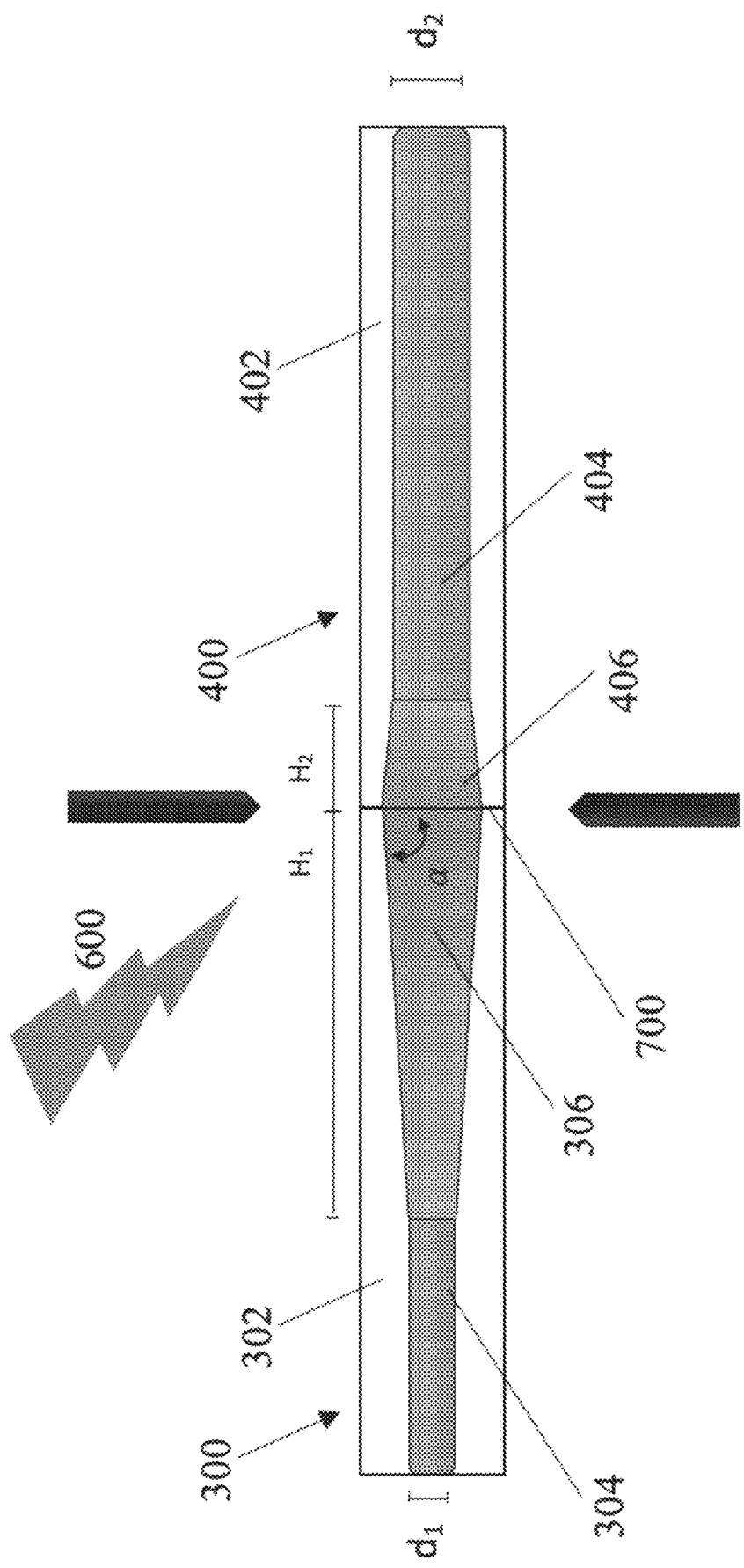

As shown in FIG. 3, the first optical fiber 300 and the second optical fiber 400 are subsequently subjected to a thermal expansion core (TEC) treatment. In one embodiment, the TEC treatment may use arc, oxyhydrogen flame, excimer laser, or carbon dioxide laser. In one preferred embodiment, it is an arc-induced TEC treatment with a temperature up to 1800 degrees Celsius to 2000 degrees, with a duration of 2 to 20 seconds, so the first optical fiber 300 and the second optical fiber 400 can be adapted in an confined region (typically about 0.4 mm) between the two arc electrodes. It is worth noting that unlike conventional thermal fiber tapering method, the present arc-induced TEC treatment does not require additional pulling force for the fiber. As shown in FIG. 3, after performing the TEC treatment for the first optical fiber 300 and the second optical fiber 400, the dopants in the core layer 304 and the core layer 404 are diffused and merged to each other at the arc region. Since the first optical fiber 300 has been subjected to the hydrogen loading treatment, the diffusion rate of the dopant is increased due to the germanium-oxygen deficiency centers (GODC) effect. Thus, though the first optical fiber 300 has the core diameter $d_1$ smaller than the core diameter $d_2$ of the second optical fiber 400, the dopant diffusion rate in the first optical fiber 300 is greater than that in the second optical fiber 400, and the final core diameter of the first optical fiber 300 will be close to the core diameter of the second optical fiber 400, making the mode field diameters of the two optical fibers match with each other and thus completing the fiber adaption. In one embodiment, the mold field diffusion rate of the first optical fiber 300 is 4~20×10$^{-8}$ cm$^2$/s. It is noted that the match of the mode field diameters guided in the two fiber cores is related to both the core diameter of the optical fiber and the numerical aperture (N.A.), whereas the numerical aperture of the fiber is defined by the refractive index values of the core layer and an outer layer. For instance, when comparing two optical fibers with the same outer diameter but with different dopant concentrations, the one with higher dopant concentration would represent a higher N.A. value and a smaller MF diameter. In one preferred embodiment of the present invention, since the single mode fiber is preferably used, the MF diameter would be slightly larger but close to the core diameter. Therefore, the term "MF matching" referred in the present invention may also be referred to as "fiber core matching.". MF matching can be described by measuring the transmission rate between the first optical fiber 300 and the second optical fiber 400 (correlation method is described below). In one embodiment, an MF area ratio between the first optical fiber 300 and the second optical fiber 400 is about 0.9 to 1.1, and the transmission rate between the first optical fiber 300 and the second optical fiber 400 is about 0.9 to 1.

Figure 4:
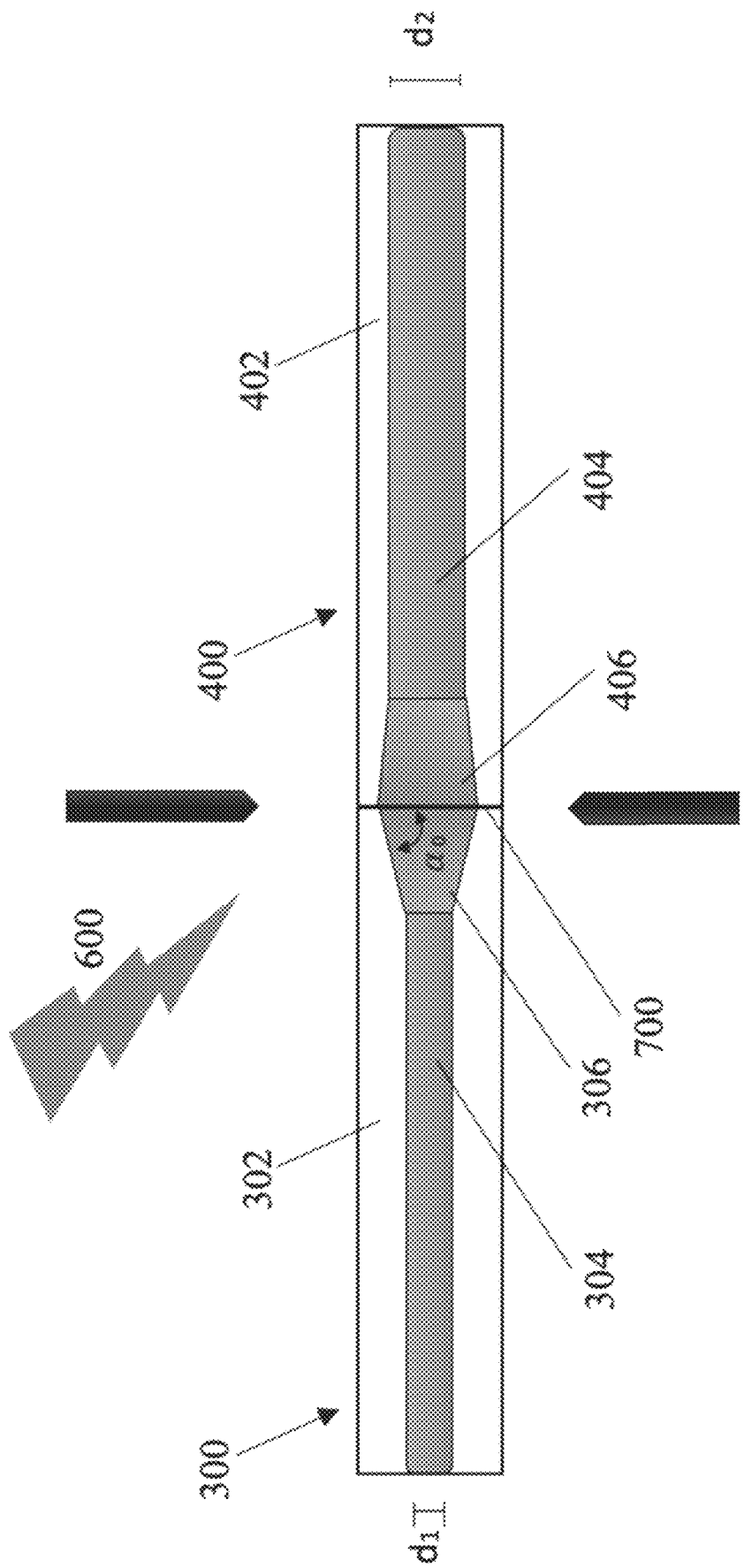
FIG. 4 illustrates one schematic diagram showing the splicing optical fiber that is not subjected to hydrogen loading treatment.

Through the above method, a spliced optical fiber structure can be formed. As shown in FIG. 3, the spliced optical fiber includes a first fiber portion (the original first optical fiber 300) having a first core layer 304, and a second fiber portion (the original second optical fiber 400) having a second core layer 404, wherein the first core layer 304 has a smaller diameter than that of the second core layer 404. A fused section 700 is formed at the spliced intersection between the first fiber portion and the second fiber portion. As mentioned above, after the TEC treatment, the MF region of first fiber portion is matched with the MF region of the second portion at the fused section 700. Since the MF region can correspond to the core layer in most circumstances, to one skilled in the art, it is understood that the first core layer 304 of the first fiber portion is also corresponded to the second core layer 404 of the second fiber portion. That is, they are aligned to each other and have substantially the same area at the fused section 700. In detail, the first core layer 304 has a first cone 306 near the fused section 700, and the first cone 306 has a first height $H_1$ and an angle $\alpha$ with respect to the fused section 700. The second core layer 404 has a second cone 406 near the fused section 700, and the second cone 406 has a second height $H_2$. Since the first optical fiber 300 is subjected to the hydrogen loading treatment, the critical diffuse temperature of the dopant in the first optical fiber 300 is lowered so the dopant can be spread in a more distance far from the central of the arc. Accordingly, the first height $H_1$ of the first cone 306 is greater than the second height $H_2$ of the second cone 406. On the other hand, the first optical fiber 300 is shown to have different structure because of the hydrogen loading treatment, which changes the diffusion rate of the dopant. Please refer to FIG. 3 and FIG. 4, wherein FIG. 4 shows the spliced optical fiber without performing hydrogen loading treatment. From FIG. 3 and FIG. 4, it is demonstrated that the angle α in FIG. 3 (loading hydrogen) is greater than the angle $α_0$ in FIG. 4 (without loading hydrogen), so the tapering slope of the first cone 306 becomes smaller. In one embodiment, the angle α is close to 90 degrees, for example, 87.5~89.9 degrees. Since the hydrogen loading treatment results in the decreased tapering slope of the first cone 306, it is advantageous for the MF adaptation with reducing the loss and increasing the optical transmission, so as to give a better quality of the spliced optical fiber.

Since the hydrogen loading treatment may be applied to adaptation of the optical fibers by shortening the adaptation time, low-loss and high quality of optical fiber devices can be provided. The method set forth in the present invention can be applied to any optical devices having spliced optical fibers, such as the Q-switched pulsed laser emitters consisted of resonant cavity and the fiber Bragg grating (FBG) or other high-power lasers, but is not limited thereto. In order to demonstrate the reduced transmission loss of the mode-field adaptation from the present invention, the following content will show experiments and give detail explanation and discussion.

Figure 5:
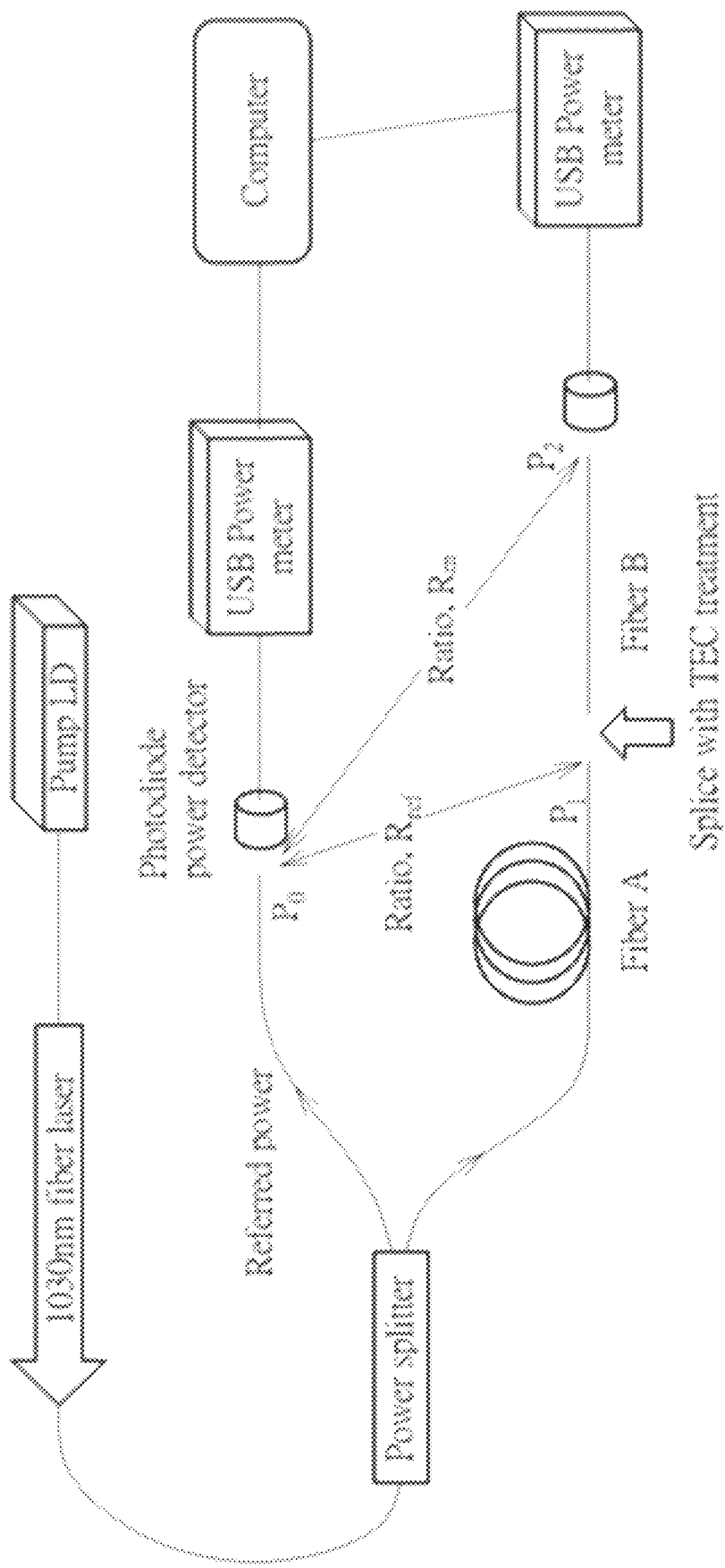
FIG. 5 illustrates a schematic diagram of the experiment setup designed for measuring the transmission loss between optical fibers and monitoring the improvement with the arc-induced TEC treatment.

To monitor the instant splice loss improved by the arc-TEC treatment and preclude the inaccuracy caused by power fluctuation and wavelength sensitivity, a precise measurement system was designed and is shown in FIG. 5. As shown in FIG. 5, the power splitter was connected to a home-made 1030-nm CW Yb-doped fiber laser, which served as a wavelength-stable light source. The laser power was set at 3 mW. One port of the power splitter was spliced with one of the fiber samples, Fiber A. The power ratio between the two ports of the power splitter, $R_{ref}=P_1/P_0$, was first determined to be 1.53 with a standard deviation of 0.2%. During the step-by-step arc-TEC treatment, the splice transmission between Fibers A and B was monitored by measuring the power ratio between the two output ports, $R_m=P_2/P_0$, and acquired by $T_m=R_m/R_{ref}$.

Figure 6:
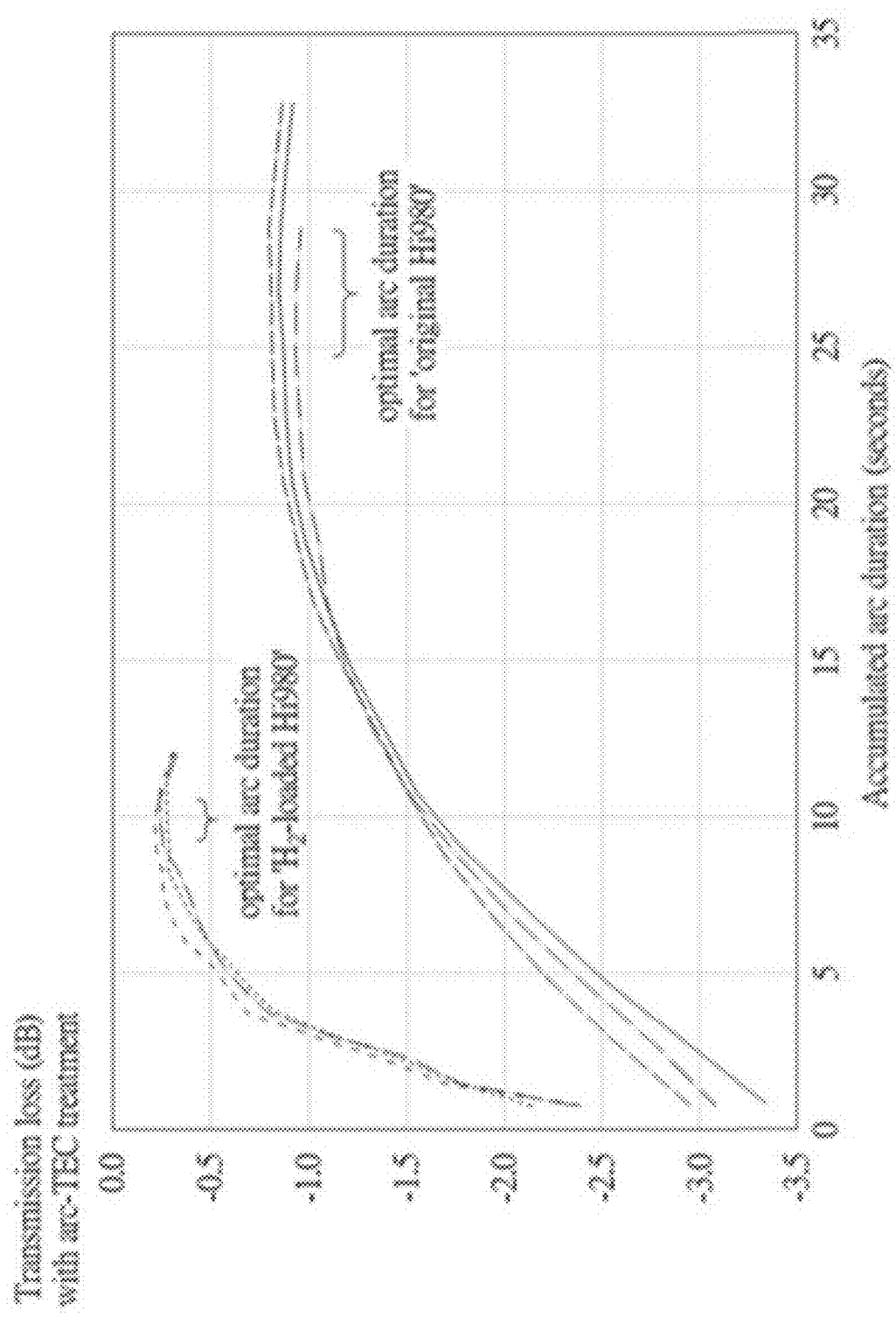
FIG. 6 shows the transmission curves for splicing the LMA fiber, P10/125-08, with the small-core fibers, Hi980 and H$_2$-loaded Hi980, improved by a step-by-step arc-induced TEC method.

In the present embodiment, we chose a large-core, single-mode and single-clad fiber with model number P10/125-08 made by Liekki Inc. as Fiber B, and a small-core, single-mode fiber (SMF) Hi980 made by Corning Inc. served as Fiber A. Both the original Hi980 and the $H_2$-loaded Hi980 were tested for comparison. In the specifications, the LMA fiber P10/125-08 has a core diameter (CD) of 10 μm and a small numerical aperture (NA) of 0.08, and fiber Hi980 has a CD of 3.5 μm and a NA of 0.21. The MF areas at 1030 nm can be calculated to be $9.3×10^{-7}$ cm$^2$ ($A_{ob}$, for Fiber B) and $1.28×10^{-7}$ cm$^2$ ($A_{oa}$) correspondingly by Marcuse's equations. The MF area ratio between them was then 7.25. The $H_2$-loaded Hi980 fiber was prepared and loaded in a gas cylinder of pure hydrogen with a high pressure of 1700 psi for 2 weeks and then tested at approximately 30 hours after being unloaded from the gas cylinder. The fiber splicer employed here was S178 LDF, made by Fitel Inc. Fibers A and B were spliced with a standard SMF-SMF arc program, followed by step-by-step manually added arcs at the same spliced joint without shifting and pulling applied. In S178 LDF, the arc power range is scaled from 0 to 200, and set to 100 by default. The true power is not revealed in the machine specifications. Nevertheless, independent of the splicer manufacturers, the required arc power for a standard SMF-SMF splicing should be the same and can serve as a good power reference to normalize with. Therefore in the experiment, the power of every arc step was set to 100, and then the most preferable parameter to relate the output performance was the total accumulated arc duration. The transmission after every applied arc was recorded and eventually plotted as a curve, as shown in FIG. 6. Three typical transmission curves for either one of the cases using Hi980 and the $H_2$-loaded Hi980 spliced with P10/125-08 were measured and are shown for comparison. The duration of every arc was 750 ms by default. However, due to the slower diffusion rate of the original Hi980, the duration of each additional arc was set to be 2 seconds while the original Hi980 fiber was tested. The transmission is presented as the loss in dB (y axis) corresponding to the accumulated arc duration of the applied arcs (x axis). For the original Hi980 spliced with P10/125-08, the maximum transmission with the arc-induced TEC treatment was approximately 81.5% (i.e., −0.89 dB), which could usually be achieved with an accumulated arc duration of 27±2 seconds. When the $H_2$-loaded Hi980 was employed, the optimal transmission was increased to 94.6% (i.e., −0.24 dB) achieved with a much shorter accumulated arc duration of 9.8 seconds on average.

It was also found that if the splicing and the TEC treatment was executed in one long arc step instead of applying multiple-step short arcs, then the transmission of −0.24 dB could be achieved with an even shorter arc duration of approximately 8 seconds. It should be noted that there was a pre-fusion duration in every arc step that was known as the time period required for heating up a fiber from room temperature to the melting point. Additionally, it was considered the time period during which the dopants did not effectively diffuse. The pre-fusion time period was 160 ms by default in the splicer. Therefore, the shorter arc duration for achieving the optimal (i.e. −0.24 dB in 8 seconds) in one arc was attributed to the less pre-fusion time. In addition, the fusion-splicing losses between the two fibers caused by the MF area mismatch, the radial offset and the angular misalignment can be calculated by the overlap integral of the MF amplitudes in the spliced fibers. By assuming perfect alignment, the transmission loss caused only by the MF area mismatch can be expressed as Equation (I):

$$T_{MFA} = -10\log_{10}\left(\frac{4}{R_A + R_A^{-1} + 2}\right) \quad \text{Equation (I)}$$

where $R_A$ is the MF area ratio of the two spliced fibers. Therefore, for splicing the P10/125-08 fiber with the original Hi980 fiber with no core expansion (i.e., $R_{Ao}$=7.25), the theoretical transmission loss is −3.71 dB by Eq. (I).

The enhancement of the Ge diffusion rates by hydrogen loading can be quantized and approximately estimated based on the results in FIG. 6 and deducted below. The calculated variables are listed in Table 1. First, the two cases are compared at a chosen transmission loss of −1.5 dB where the loss caused by the TEC transition region slope was negligible (see FIG. 8 and the later discussion). The TEC-treated MF area ratio, $R_{A,tec}$, at the loss of −1.5 dB could be calculated to be 3.35 by Eq. (1). The accumulated arc durations for achieving the transmission loss of −1.5 dB were 2.25 and 10.75 seconds for the cases of using the $H_2$-loaded Hi980 and the original Hi980, and by subtracting the pre-fusion durations described above (i.e., 2.25−0.16×3 and 10.75−0.16×6), the effective diffusion durations were 1.77 and 9.79 seconds, correspondingly. They are symbolized as $T_{d,h}$ and $T_{d,o}$ in Table 1.

TABLE 1

| | Before Arcing | |
|---|---|---|
| | Hi980 (H$_2$-loaded Hi980) | P10/125-08 |
| T$_o$, transmission without the TEC effects by Eq. (1) | −3.71 dB | |
| MF area ratio between the fibers | 7.25(R$_{Ao}$) | |
| MF diameters (calculated) | 4.04 μm | 10.88 μm |
| MF areas (calculated) | 1.28 × 10$^{-7}$ cm$^2$(A$_{oa}$) | 9.3 × 10$^{-7}$ cm$^2$(A$_{ob}$) |

| | After arc-TEC treatment | | | |
|---|---|---|---|---|
| | H$_2$-loaded Hi980 | P10/125-08 | Original Hi980 | P10/125-08 |
| T$_{TEC}$, TEC-improved transmission | −1.5 dB | | | |
| TEC-treated MF area ratio by Eq. (1) | 3.35(R$_{A, tec}$) | | | |
| Accumulated arc durations (secs) | 2.25(τ$_{ac, h}$) | | 10.75(τ$_{ac, o}$) | |
| Effective diffusion durations (secs) | 1.77(τ$_{d, h}$) | | 9.79(τ$_{ac, h}$) | |
| Area difference expanded by TEC effects (cm$^2$) | 1.61 × 10$^{-7}$ (ΔA$_{HL}$) | 3.85 × 10$^{-8}$ (ΔA$_S$) | 2.13 × 10$^{-7}$ (ΔA$_o$) | 2.13 × 10$^{-7}$ (ΔA$_o$) |
| MF expansion rate(cm$^2$/s) | 9.09 × 10$^{-8}$ | 2.18 × 10$^{-8}$ | 2.18 × 10$^{-8}$ | 2.18 × 10$^{-8}$ |

Because the P10/125-08 and the original Hi980 have the same Ge diffusion coefficient (cm$^2$/s), their MF area differences increased by diffusion, Δ$_{Ao}$, should be the same and could be calculated to be 2.13×10$^{-7}$ cm$^2$ for reaching the referred TEC-treated MF area ratio of 3.35 by Eq. (2), $$R_{A,tec} = \frac{A_{ob} + \Delta A_o}{A_{oa} + \Delta A_o} \qquad \text{Eq. (2)}$$

For the case of splicing P10/125-08 with the H$_2$-loaded Hi980, due to the shorter diffusion duration, the increased area ΔAs in the P10/125-08 was 3.85×10$^{-8}$ cm$^2$ calculated by ΔAo×(τ$_{d,h}$/τ$_{d,o}$). To reach the same referred MF ratio of 3.35, the increased area in the H$_2$-loaded Hi980, ΔA$_{HL}$, should be 1.61×10$^{-7}$ cm$^2$ by Eq. (3), $$R_{A,tec} = \frac{A_{ob} + \Delta A_S}{A_{oa} + \Delta A_{HL}} \qquad \text{Eq. (3)}$$

Therefore, the MF expansion rate of the H$_2$-loaded Hi980 was estimated to be approximately 4.2 times higher than that of the original Hi980.

Figures 7A, 7B, 7C:
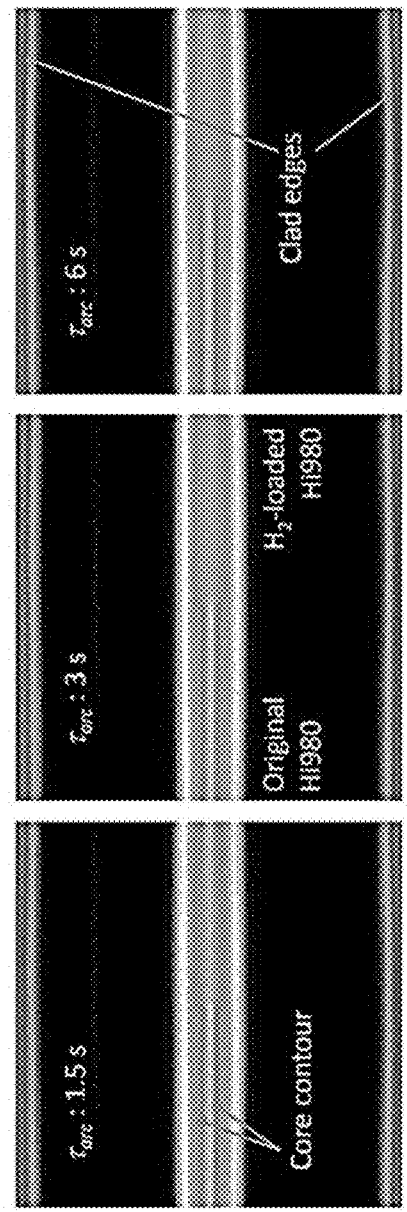
FIGS. 7(A), 7(B) and 7(C) show the photos of The arc-induced core expansions of the spliced fibers, Hi980 (on the left) and H2-loaded Hi980 with various arc durations of 1.5, 3, and 6 seconds.
Figure 7D:
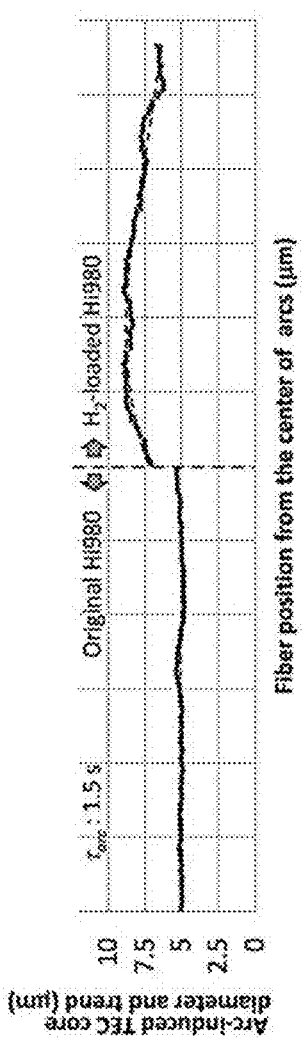
FIGS. 7(D), 7(E) and 7(F) show line charts of the core diameters calculated from the core contours of the photos.
Figure 7E:
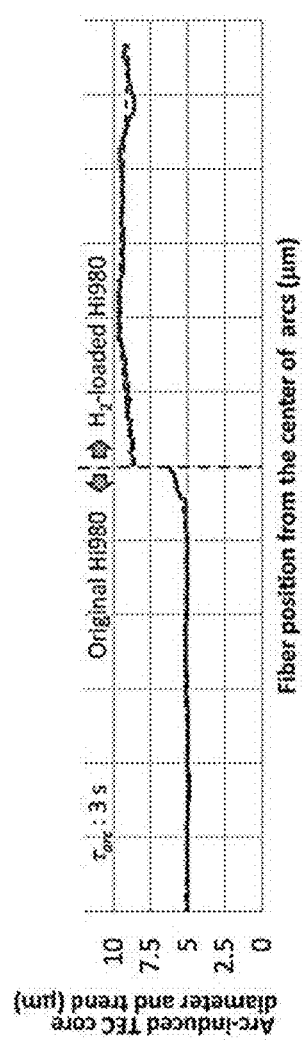
Figure 7F:
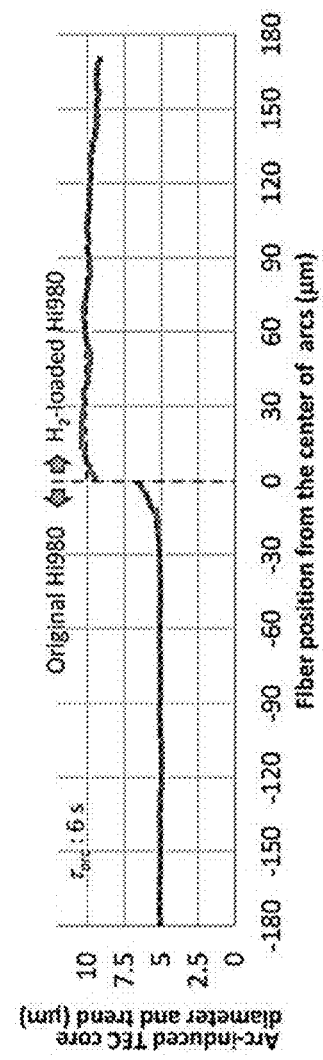

The major advantages of using the H$_2$-loaded fiber are the extension of the arc-induced TEC region and the difference in diffusion rates at the spliced intersection that reduces the transmission loss and shortens the processing time. To demonstrate these advantages, the images near the arc-fusion zone of the spliced fibers were captured and processed to determine the core expansions, as shown in FIGS. 7(A)-(F). Here, the fibers Hi980 and H$_2$-loaded Hi980 were spliced together for comparison and arc-TEC treated with various accumulated arc durations of 1.5, 3 and 6 seconds. The photographs captured by the splicer are shown in FIGS. 7(A)-(C). The core contours were calculated in image processing by recognizing the darkest points that were nearest to the bright centers of the cores, and then the core diameters and the variations were retrieved and are shown in FIGS. 7(D)-(F) correspondingly.

As shown in FIG. 7, the core diameter of the H$_2$-loaded Hi980 fiber was expanded up to 10 μm in 6 seconds with a relatively longer transition region. The comparison with the results of the original Hi980 reveals a greatly increased Ge diffusion rate by hydrogen loading. It should be noted that the way to define a CD by the contour has a precision limitation for measuring a small CD due to the low image resolution. For instance, the measured CD of the original Hi980 was close to 5 μm instead of 3.5 μm in the official specification. Therefore, the TEC region of the original Hi980 might be a little longer than that in FIGS. 7(D)-(F). In spite of the resolution limitation, the differences in Ge diffusion rates and the expansion trends are clearly shown.

Figure 8:
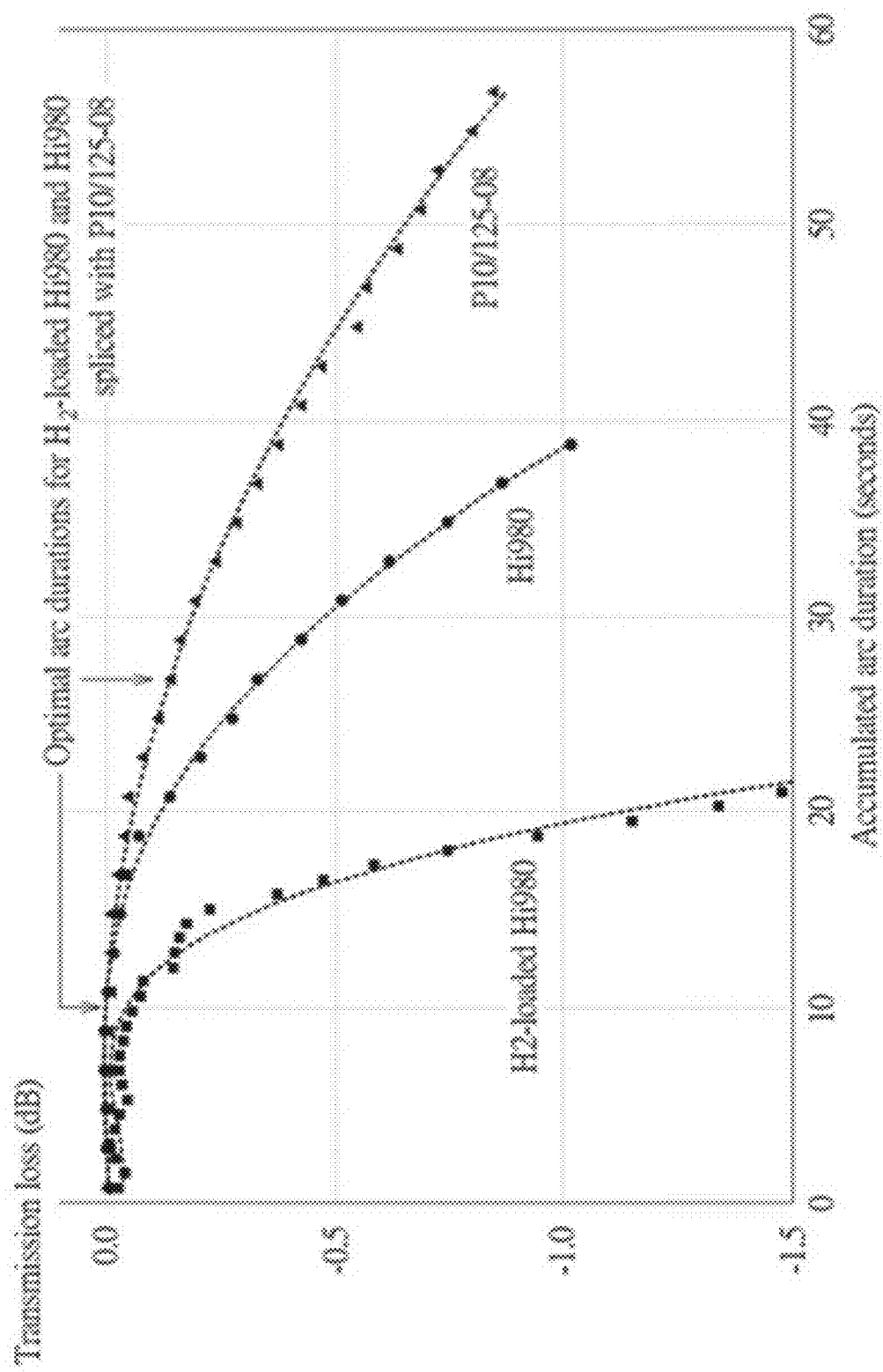
FIG. 8 shows the transmission loss, $L_{slp}$ of three optical fibers ($H_2$-loaded treatment Hi980, original Hi980 and P10/125-09).

To further understand the causes of loss and the limit of arc-induced MF adapting, we let Fibers A and B be the same type of fiber, spliced and kept arcing them until great transmission losses occurred. Three fiber types, the H$_2$-loaded Hi980, Hi980 and P10/125-08, were tested and the transmission degrading curves are shown in FIG. 8. Because of the negligible losses of MF mismatch and other misalignment factors, the later emerged loss should be solely attributed to the increased transition slope of the TEC region, herein indicated by L$_{slp}$. Based on FIG. 8, it is justified to say that for splicing P10/125-08 with Hi980, as shown in FIG. 5, the loss part L$_{slp}$ should be the average of the two curves of P10/125-08 and Hi980 shown in FIG. 8. For instance, with the optimal arc duration of 27 seconds (see FIG. 6), the loss L$_{slp}$ was expected to be approximately −0.23 dB (i.e., the average of 0.13 and 0.33 from the curves in FIG. 8). On the other hand, for splicing P10/125-08 with the H$_2$-loaded Hi980, the loss L$_{slp}$ with the optimal arc duration of 9.8 seconds (see FIG. 6) was only −0.03 dB and there was almost no loss from the part of P10/125-08. It was noted that the loss part Lslp of −0.03 dB was better than the experimental optimal data of −0.24 dB in FIG. 6, indicating a possible loss mechanism other than $L_{slp}$ and the MF size mismatch. The cause of the loss gap of 0.21 dB was not clear and might be attributed to a possible asymmetric core expansion by one-dimensional arcing. After all, perfect MF adaptation requires the match of not only the area size but also the shape at the junction of the two mismatched fibers. That is, the transmission should be further improved if the fibers were TEC-treated with a more symmetric heating source such as a three-electrode arc splicer.

The present invention has demonstrated that MF adaptation using the arc-induced TEC method could be much improved by hydrogen loading the fiber with a relatively smaller core. For MF adapting the mismatched fibers with a large MF area ratio of 7.25, the transmission loss was reduced from a theoretical −3.71 dB to −0.24 dB in an accumulated arc duration of 9.8 seconds. The Ge diffusion rate of the $H_2$-loaded silica fiber was estimated to be 4.2 times higher than that of the original fiber. Due to the enhanced diffusion rate of Ge by hydrogen loading, MF adaptation between two highly mismatched fibers can be efficiently achieved in a very short arc time with the fiber shape remaining unchanged. The physics of the enhanced Ge diffusion rate was attributed to germanium-oxygen vacancy defects induced by the loaded hydrogen molecules near Ge sites and the high arc temperature. More dedicated experiments and theoretical modeling are required for further clarification of the mechanism. It should be expectable that the enhancement of MF adaptation can also be achieved using various heat sources, such as $CO_2$ lasers and $O_2$—$H_2$ flames.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of splicing optical fibers, comprising:
   providing a first optical fiber and a second optical fiber, wherein a core diameter of the first optical fiber is smaller than a core diameter of the second optical fiber;
   performing a hydrogen loading treatment for the first optical fiber to load hydrogen atoms into the first optical fiber, wherein the second optical fiber is not subjected to any hydrogen loading treatment; and
   performing a thermal expansion core (TEC) treatment for the first optical fiber and the second optical fiber to match the mode-field (MF) of the first optical fiber and the second optical fiber at the fused section between the first optical fiber and the second optical fiber.

2. The method of splicing optical fibers according to claim 1, wherein the hydrogen loading treatment comprises placing the first optical fiber under a high hydrogen pressure environment, and the high hydrogen pressure environment is 1200 psi to 2000 psi.

3. The method of splicing optical fibers according to claim 1, wherein the first optical fiber and the second optical fiber comprise a dopant that defines each core diameter of the first optical fiber and the second optical fiber, wherein in the TEC treatment, a diffusion rate of the dopant in the first optical fiber is greater than a diffusion rate of the dopant in the second optical fiber.

4. The method of splicing optical fibers according to claim 1, wherein the TEC treatment comprises a treatment selected from the group consisting of using arc, oxyhydrogen flame, excimer laser, and carbon dioxide laser.

5. The method of splicing optical fibers according to claim 1, wherein the method is used to fabricate a passive Q-switched pulsed laser.

6. The method of splicing optical fiber according to claim 1, wherein before performing the TEC treatment, a MF area ratio between the first optical fiber and the second optical fiber is 1.3 to 1.6.

7. The method of splicing optical fibers according to claim 1, wherein after performing the TEC treatment, a MF area ratio between the first optical fiber and the second optical fiber is 0.9 to 1.1.

8. The method of splicing optical fibers according to claim 1, wherein after performing the TEC treatment, a transmission rate between the first optical fiber and the second optical fiber is 0.9 to 1.

9. The method of splicing optical fibers according to claim 1, wherein an accumulated arc duration of the TEC treatment is 2 to 20 seconds.

10. The method of splicing optical fibers according to claim 1, wherein during the TEC treatment, a MF diffusion rate of the first optical fiber is 4 to 20×10 to 8 cm2/s.

11. A spliced optical fiber, comprising:
    a first optical fiber part, comprising a first core layer;
    a second optical fiber part, comprising a second core layer, wherein the first core layer has a dimeter less than that of the second core, and the first optical fiber part comprises hydrogen and the second optical fiber part does not comprise hydrogen; and
    a fused section, disposed at the intersection between the first optical fiber part and the second optical fiber part, wherein the mode-field of the first optical fiber part and the second optical fiber part are matched at the fused section.

12. The spliced optical fiber according to claim 11, wherein an MF area ratio between the first optical fiber part and the second optical fiber part is 0.9 to 1.1.

13. The spliced optical fiber according to claim 11, wherein a transmission rate between the first optical fiber part and the second optical fiber part is 0.9 to 1.

14. The spliced optical fiber according to claim 11, wherein the first core layer has a first cone adjacent to the fused section, and the first cone has a first height, and the second core layer has a second cone adjacent to the fused section, and the second cone has a second height, wherein the first height is greater than the second height.

15. The spliced optical fiber according to claim 14, wherein the first cone has an angle with respect to the fused section and the angle is 87.5 degrees to 89.9 degrees.

* * * * *